US012105436B2

(12) United States Patent
Saito et al.

(10) Patent No.: US 12,105,436 B2
(45) Date of Patent: Oct. 1, 2024

(54) CHARGING ROLL FOR ELECTROPHOTOGRAPHIC EQUIPMENT

(71) Applicant: Sumitomo Riko Company Limited, Aichi (JP)

(72) Inventors: Yoshihiro Saito, Aichi (JP); Shimpei Miyagawa, Aichi (JP)

(73) Assignee: Sumitomo Riko Company Limited, Aichi (JP)

( * ) Notice: Subject to any disclaimer, the term of this patent is extended or adjusted under 35 U.S.C. 154(b) by 0 days.

(21) Appl. No.: 18/348,336

(22) Filed: Jul. 6, 2023

(65) Prior Publication Data

US 2023/0350321 A1 Nov. 2, 2023

Related U.S. Application Data

(63) Continuation of application No. PCT/JP2022/011153, filed on Mar. 13, 2022.

(30) Foreign Application Priority Data

Mar. 25, 2021 (JP) ................................ 2021-051836

(51) Int. Cl.
*G03G 15/02* (2006.01)

(52) U.S. Cl.
CPC ................................ *G03G 15/0233* (2013.01)

(58) Field of Classification Search
CPC .................................................. G03G 15/0233
See application file for complete search history.

(56) References Cited

U.S. PATENT DOCUMENTS

| | | | | |
|---|---|---|---|---|
| 6,259,875 B1 | 7/2001 | Miura et al. | | |
| 9,746,792 B1 * | 8/2017 | Hayashi | G03G 15/0233 | |
| 2016/0252854 A1 * | 9/2016 | Oshima | G03G 15/2057 399/333 | |

(Continued)

FOREIGN PATENT DOCUMENTS

| | | | |
|---|---|---|---|
| EP | 3605241 A1 * | 2/2020 | G03G 15/0233 |
| JP | 2000075595 | 3/2000 | |

(Continued)

OTHER PUBLICATIONS

"International Search Report (Form PCT/ISA/210) of PCT/JP2022/011153", mailed on May 10, 2022, with English translation thereof, pp. 1-4.

(Continued)

*Primary Examiner* — Sophia S Chen
(74) *Attorney, Agent, or Firm* — JCIPRNET

(57) ABSTRACT

A charging roll includes a shaft body, an elastic body layer formed on an outer circumferential surface of the shaft body, and a surface layer formed on an outer circumferential surface of the elastic body layer. The elastic body layer includes silicone rubber. A plurality of large protruding parts having a width of 13-48 μm and a height of 5-13 μm are provided on the outer circumferential surface of the elastic body layer, and a plurality of small protruding parts forming unevenness having a ten-point average roughness Rz of 1.0-6.0 μm are provided on the surface of the large protruding parts. The surface layer contains a urethane polymer, and the elongation at breakage of the surface layer is 285-525%.

10 Claims, 2 Drawing Sheets

(56) References Cited

U.S. PATENT DOCUMENTS

Figure 1:
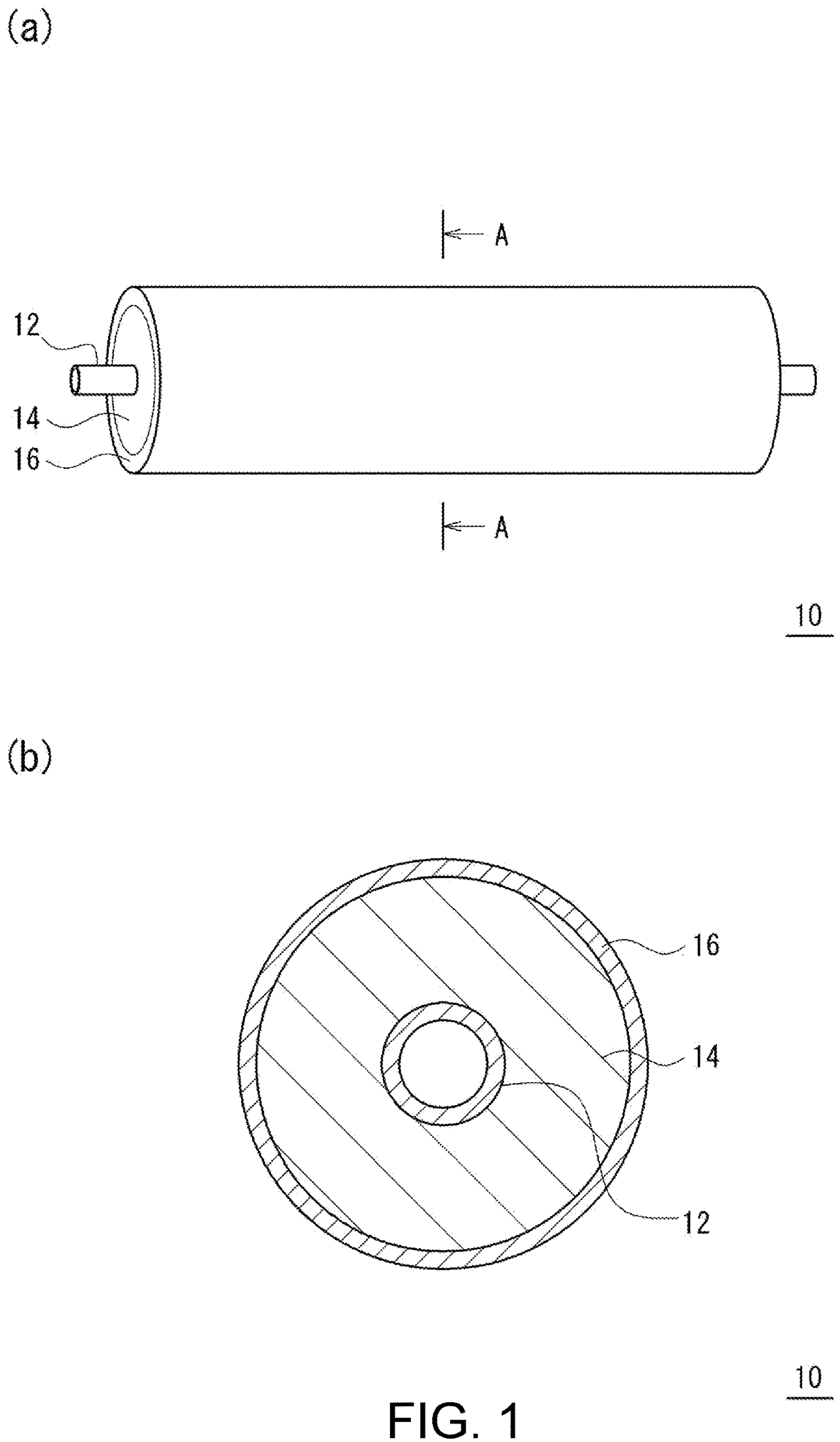

| | | | | |
|---|---|---|---|---|
| 2019/0018362 | A1* | 1/2019 | Morishita | G03G 15/0233 |
| 2020/0019080 | A1* | 1/2020 | Uesugi | G03G 15/0233 |
| 2020/0172701 | A1* | 6/2020 | Tanaka | C08K 5/5419 |

FOREIGN PATENT DOCUMENTS

| | | |
|---|---|---|
| JP | 2009162885 | 7/2009 |
| JP | 2014066857 | 4/2014 |
| JP | 2014211519 | 11/2014 |
| JP | 2015045788 | 3/2015 |
| JP | 2019105663 | 6/2019 |

OTHER PUBLICATIONS

"Written Opinion of the International Searching Authority (Form PCT/ISA/237) of PCT/JP2022/011153", mailed on May 10, 2022, with English translation thereof, pp. 1-8.

* cited by examiner

CHARGING ROLL FOR ELECTROPHOTOGRAPHIC EQUIPMENT

CROSS-REFERENCE TO RELATED APPLICATION

The present application is a continuation of PCT/JP2022/011153, filed on Mar. 13, 2022, and is related to and claims priority from Japanese Patent Application No. 2021-051836 filed on Mar. 25, 2021. The entire contents of the aforementioned application are hereby incorporated by reference herein.

TECHNICAL FIELD

The disclosure relates to a charging roll for electrophotographic equipment, which is suitably used in electrophotographic equipment such as copiers, printers, and facsimiles that employ an electrophotographic system.

RELATED ART

There is known a charging roll for electrophotographic equipment, which has an elastic body layer having rubber elasticity on the outer circumferential surface of a shaft body such as a core metal, and has a surface layer on the outer circumferential surface of the elastic body layer. It is known to use silicone rubber as a material for the elastic body layer in the charging roll (Patent Literature 1 (Japanese Patent Laid-Open No. 2014-211519)).

Since silicone rubber is soft, a toner in contact with the charging roll is less likely to be crushed, making it easy to suppress contamination of the roll surface due to toner crushing. On the other hand, due to the softness, the contact area between the charging roll and a photosensitive member tends to increase, and the silicone rubber is weak against a tearing force. As a result, the elastic body layer of the charging roll in contact with the photosensitive member is likely to be torn by the stress during driving, and the charging roll is likely to be broken. In addition, due to the softness, it is difficult to form a gap between the charging roll and the photosensitive member, and the amount of discharge is reduced, which results in a decrease in charging properties. Therefore, the charging roll is required to meet the requirements of suppression of toner contamination, suppression of breakage due to tearing of the elastic body layer, and satisfactory charging properties. Moreover, when the surface layer is formed on the outer circumferential surface of the elastic body layer, peeling of the surface layer from the elastic body layer also poses a problem.

SUMMARY

The disclosure provides a charging roll for electrophotographic equipment, which suppresses toner contamination, tearing/breakage of the elastic body layer, and peeling of the surface layer and exhibits excellent charging properties.

A charging roll for electrophotographic equipment according to the disclosure includes a shaft body; an elastic body layer formed on an outer circumferential surface of the shaft body; and a surface layer formed on an outer circumferential surface of the elastic body layer. The elastic body layer contains silicone rubber, and includes a plurality of large protruding parts having a width of 13 μm or more and 48 μm or less and a height of 5 μm or more and 13 μm or less on the outer circumferential surface of the elastic body layer, and a plurality of small protruding parts forming unevenness having a ten-point average roughness Rz of 1.0 μm or more and 6.0 μm or less on a surface of the large protruding parts. The surface layer contains a urethane polymer, and has an elongation at breakage of 285% or more and 525% or less.

The urethane polymer preferably has an NCO index of 100 or more and 150 or less. The surface layer preferably has a thickness of 0.1 μm or more and 2.0 μm or less. The surface layer is preferably formed along an uneven surface formed by the plurality of small protruding parts of the elastic body layer. The elastic body layer preferably has a hydroxy group or a hydroperoxy group formed on the outer circumferential surface of the elastic body layer. Preferably a plurality of small protruding parts forming unevenness having a ten-point average roughness Rz of 1.0 μm or more and 6.0 μm or less are provided on a surface between the large protruding parts. The large protruding parts preferably have a distance therebetween that is 25 μm or more and 55 μm or less. The small protruding parts preferably have a distance therebetween that is 0.4 μm or more and 3.8 μm or less. A surface area ratio $S/S_0$ of the elastic body layer is preferably 2.2 or more and 7.7 or less. The number of functional groups of polyol constituting the urethane polymer is preferably 2. The outer circumferential surface of the elastic body layer is preferably subjected to excimer treatment or corona treatment.

The charging roll for electrophotographic equipment according to the disclosure includes a shaft body, an elastic body layer formed on an outer circumferential surface of the shaft body, and a surface layer formed on an outer circumferential surface of the elastic body layer. The elastic body layer contains silicone rubber, and includes a plurality of large protruding parts having a width of 13 μm or more and 48 μm or less and a height of 5 μm or more and 13 μm or less on the outer circumferential surface of the elastic body layer, and a plurality of small protruding parts forming unevenness having a ten-point average roughness Rz of 1.0 μm or more and 6.0 μm or less on the surface of the large protruding parts. The surface layer contains a urethane polymer, and the elongation at breakage of the surface layer is 285% or more and 525% or less. Thus, toner contamination, tearing/breakage of the elastic body layer, and peeling of the surface layer are suppressed, and excellent charging properties are achieved.

When the NCO index of the urethane polymer is 100 or more and 150 or less, the elongation at breakage of the surface layer is easily kept within a specific range. Thus, the elastic body layer easily follows the surface layer, and the surface layer easily follows the elastic body layer. In this way, it is easy to suppress tearing/breakage of the elastic body layer, and it is easy to suppress peeling of the surface layer.

When the thickness of the surface layer is 0.1 μm or more and 2.0 μm or less, the charging properties and surface roughness are easily maintained.

When the surface layer is formed along the uneven surface formed by the plurality of small protruding parts of the elastic body layer, the charging properties and surface roughness are easily maintained.

When a hydroxy group or a hydroperoxy group is formed on the outer circumferential surface of the elastic body layer, the affinity between the elastic body layer and the urethane polymer is improved, the surface layer is easily formed along the uneven surface formed by the plurality of small protruding parts of the elastic body layer, and the surface layer can be covered without filling the surface unevenness of the elastic body layer. In addition, the integration between the elastic body layer and the surface layer is enhanced, and peeling of the surface layer is easily suppressed.

When the surface between the large protruding parts has the plurality of small protruding parts forming unevenness having a ten-point average roughness Rz of 1.0 μm or more and 6.0 μm or less, the discharge properties can be improved. In addition, the integration between the elastic body layer and the surface layer is enhanced, and peeling of the surface layer is easily suppressed.

When the distance between the large protruding parts is 25 μm or more and 55 μm or less, moderate surface unevenness (roughness) is formed by the plurality of large protruding parts, so the integration between the elastic body layer and the surface layer is enhanced, and peeling of the surface layer is easily suppressed. Also, excellent discharge properties can be maintained. By doing so, it is easy to suppress the occurrence of a fog image.

When the distance between the small protruding parts is 0.4 μm or more and 3.8 μm or less, the plurality of small protruding parts are appropriately dispersed on the surface of the large protruding part, so the stress applied to the small protruding parts is appropriately dispersed, and tearing/breakage of the small protruding parts is easily suppressed. In addition, the surface layer is easily formed along the uneven surface formed by the plurality of small protruding parts of the elastic body layer, and the surface layer can be covered without filling the unevenness. Furthermore, the integration between the elastic body layer and the surface layer is enhanced, and peeling of the surface layer is easily suppressed.

When the surface area ratio $S/S_0$ of the elastic body layer is 2.2 or more and 7.7 or less, the plurality of large protruding parts and the plurality of small protruding parts provide moderate surface unevenness (roughness), so the integration between the elastic body layer and the surface layer is enhanced, and peeling of the surface layer is easily suppressed. Also, excellent discharge properties can be maintained. By doing so, it is easy to suppress the occurrence of a fog image.

When the number of functional groups of the polyol constituting the urethane polymer is 2, the hardness of the surface layer is suppressed and the integration between the elastic body layer and the surface layer is enhanced, so peeling of the surface layer is easily suppressed.

When the outer circumferential surface of the elastic body layer is subjected to excimer treatment or corona treatment, a hydroxy group or a hydroperoxy group can be formed on the outer circumferential surface of the elastic body layer. Then, the affinity between the elastic body layer and the urethane polymer is improved, the surface layer is easily formed along the uneven surface formed by the plurality of small protruding parts of the elastic body layer, and the surface layer can be covered without filling the unevenness. In addition, the integration between the elastic body layer and the surface layer is enhanced, and peeling of the surface layer is easily suppressed.

BRIEF DESCRIPTION OF DRAWINGS (a) of FIG. 1 is a schematic external view of the charging roll for electrophotographic equipment according to an embodiment of the disclosure, and (b) of FIG. 1 is a cross-sectional view taken along the line A-A of (a).

Figure 2:
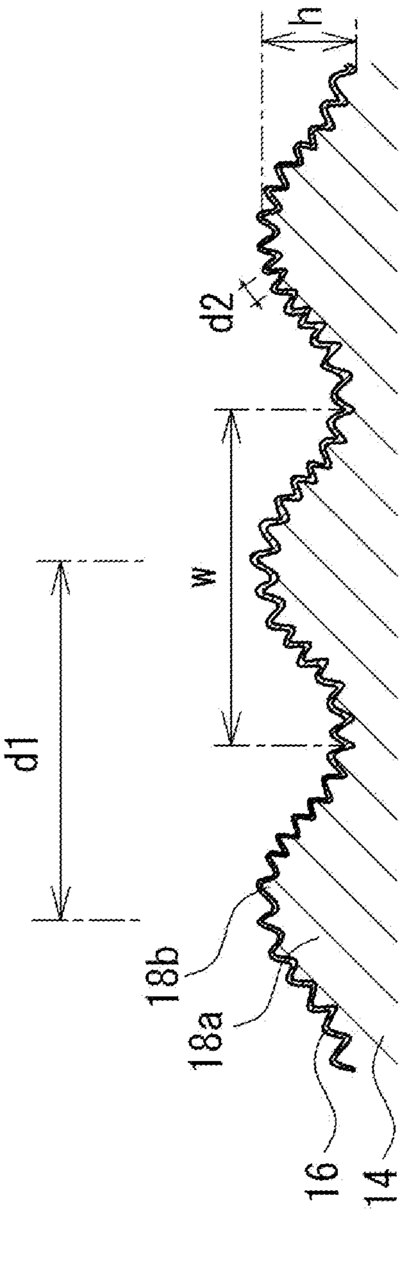

FIG. 2 is an enlarged cross-sectional view of the roll surface.

DESCRIPTION OF EMBODIMENTS

A charging roll for electrophotographic equipment (may be simply referred to as charging roll hereinafter) according to the disclosure will be described in detail. (a) of FIG. 1 is a schematic external view of the charging roll for electrophotographic equipment according to an embodiment of the disclosure, and (b) of FIG. 1 is a cross-sectional view taken along the line A-A of (a). FIG. 2 is an enlarged cross-sectional view of the roll surface.

The charging roll 10 includes a shaft body 12, an elastic body layer 14 formed on the outer circumferential surface of the shaft body 12, and a surface layer 16 formed on the outer circumferential surface of the elastic body layer 14. The elastic body layer 14 is a layer (base layer) that serves as the base of the charging roll 10. The surface layer 16 is a layer that appears on the surface of the charging roll 10. Although not shown particularly, an intermediate layer such as a resistance adjusting layer may be formed between the elastic body layer 14 and the surface layer 16 as required.

The shaft body 12 is not particularly limited as long as the shaft body 12 has conductivity. Specifically, the shaft body 12 may be a solid body made of metal such as iron, stainless steel, and aluminum, a core metal composed of a hollow body, or the like. An adhesive, a primer, or the like may be applied to the surface of the shaft body 12 as required. In other words, the elastic body layer 14 may be adhered to the shaft body 12 via an adhesive layer (primer layer). The adhesive, the primer, or the like may be made conductive as required.

The elastic body layer 14 contains silicone rubber. Since the silicone rubber is soft, a toner in contact with the charging roll 10 is less likely to be crushed, making it possible to suppress contamination of the roll surface due to toner crushing. On the other hand, since the silicone rubber is soft, the charging roll 10 tends to have a large contact area with a photosensitive member, and the silicone rubber is weak against a tearing force. As a result, the elastic body layer 14 of the charging roll 10 is likely to be torn by the stress during driving, and the charging roll 10 is likely to be broken. In addition, since the silicone rubber is soft, it is difficult to form a gap between the charging roll 10 and the photosensitive member. As a result, the amount of discharge is reduced, so there is a risk that the charging properties may decrease.

Thus, the charging roll 10 of the disclosure has a configuration that the outer circumferential surface of the elastic body layer 14 containing silicone rubber is formed into a specific shape, and the specific surface layer 16 containing a urethane polymer is provided on the outer circumferential surface of the elastic body layer 14. Thus, while contamination of the roll surface due to toner crushing is suppressed, the elastic body layer 14 is suppressed from being torn by the stress during driving, and a gap is secured between the charging roll 10 and the photosensitive member to ensure the charging properties.

As shown in FIG. 2, the elastic body layer 14 has a plurality of large protruding parts **18*a* having a width of 13 μm or more and 48 μm or less and a height of 5 μm or more and 13 μm or less on the outer circumferential surface thereof, and has a plurality of small protruding parts 18*b* forming unevenness having a ten-point average roughness Rz of 1.0 μm or more and 6.0 μm or less on the surface of the large protruding parts 18*a*. As the elastic body layer 14 has the plurality of large protruding parts 18*a* on the outer circumferential surface thereof, the roll surface is formed with a roughness that ensures sufficient discharge, which makes it possible to ensure the charging properties. By doing so, it is easy to suppress the occurrence of a fog image. In addition, as the elastic body layer 14 has the plurality of small protruding parts 18*b* on the surface of the large protruding parts 18***a*, the elastic body layer 14 has a large contact area with the surface layer 16, and peeling of the surface layer 16 from the elastic body layer 14 is easily suppressed.

If the width w of the large protruding part 18*a* is less than 13 μm, the width w of the large protruding part 18*a* is too narrow, the effect of reducing the contact area of the elastic body layer 14 that comes into contact with the photosensitive member via the surface layer 16, brought by the large protruding part 18*a*, is small, and the elastic body layer 14 is torn and broken by the stress during driving. Then, from the viewpoint of suppressing breakage of the elastic body layer 14 during driving, the width w of the large protruding part 18*a* is preferably 15 μm or more, more preferably 20 μm or more, and even more preferably 25 μm or more. On the other hand, if the width w of the large protruding part 18*a* is more than 48 μm, the contact area of the large protruding part 18*a* that comes into contact with the photosensitive member via the surface layer 16 is too large, and the large protruding part 18*a* is torn and broken by the stress during driving. Then, from the viewpoint of suppressing breakage of the large protruding part 18*a* during driving, the width w of the large protruding part 18*a* is preferably 45 μm or less, and more preferably 40 μm or less.

If the height h of the large protruding part 18*a* is less than 5 μm, the roll surface is not formed with a roughness that ensures sufficient discharge, and the charging properties are not satisfactory. Then, from the viewpoint of excellent charging properties, the height h of the large protruding part 18*a* is preferably 6 μm or more, and more preferably 7 μm or more. On the other hand, if the height h of the large protruding part 18*a* is more than 13 μm, the large protruding part 18*a* is too high, and the elastic body layer 14 is torn at the base of the large protruding part 18*a*. As a result, the charging properties are not satisfactory. Then, from the viewpoint of suppressing breakage of the large protruding part 18*a*, the height h of the large protruding part 18*a* is preferably 12 μm or less, and more preferably 10 μm or less.

If the ten-point average roughness Rz of the surface of the large protruding part 18*a* formed by the plurality of small protruding parts 18*b* is less than 1.0 μm, the roughness of the surface of the large protruding part 18*a* is insufficient, and peeling of the surface layer 16 is not suppressed. Then, from the viewpoint of suppressing peeling of the surface layer 16, the ten-point average roughness Rz is preferably 1.5 μm or more, and more preferably 2.0 μm or more. On the other hand, if the ten-point average roughness Rz is more than 6.0 μm, the small protruding part 18*b* is too large, and the elastic body layer 14 is torn at the base of the small protruding part 18*b*. Then, from the viewpoint of suppressing breakage of the small protruding part 18*b*, the ten-point average roughness Rz is preferably 5.5 μm or less, and more preferably 5.0 μm or less.

The roughness Rz is a ten-point average roughness, and is the average value of values measured at any five points in accordance with JIS B0601 (1994). The ten-point average roughness Rz of the surface of the large protruding part 18*a* formed by the plurality of small protruding parts 18*b* may be measured by observation using a laser microscope (for example, "VK-9510" or the like manufactured by KEYENCE).

The surface layer 16 contains a urethane polymer. By providing the specific surface layer 16 containing the urethane polymer on the outer circumferential surface of the elastic body layer 14 that contains silicone rubber, the tearing weakness of the elastic body layer 14 due to the silicone rubber can be improved. The surface layer 16 containing the urethane polymer has an elongation at breakage of 285% or more and 525% or less. By using a relatively stretchable urethane polymer as the material of the surface layer 16 and bringing the elongation and hardness of the surface layer 16 close to the elongation and hardness of the elastic body layer 14 that contains silicone rubber, the movements of the surface layer 16 and the elastic body layer 14 are integrated for the surface layer 16 to follow the movement of the elastic body layer 14, which makes it possible to improve the tearing weakness of the elastic body layer 14 due to the silicone rubber.

If the elongation at breakage of the surface layer 16 is less than 285%, the surface layer 16 is too hard to follow the elastic body layer 14, and the elastic body layer 14 containing silicone rubber is torn and broken by the stress during driving. In addition, from the viewpoint of suppressing tearing/breakage of the elastic body layer 14, the elongation at breakage of the surface layer 16 is more preferably 300% or more, and even more preferably 320% or more. On the other hand, if the elongation at breakage of the surface layer 16 is more than 525%, the surface layer 16 is too soft for the elastic body layer 14 to follow the surface layer 16, and only the surface layer 16 is moved by the stress during driving, which causes the surface layer 16 to peel from the elastic body layer 14. In addition, from the viewpoint of suppressing peeling of the surface layer 16, the elongation at breakage of the surface layer 16 is preferably 500% or less, more preferably 450% or less, and even more preferably 400% or less.

The surface layer 16 is preferably formed along the uneven surface formed by the plurality of small protruding parts 18*b* of the elastic body layer 14. When the surface layer 16 is formed along the uneven surface formed by the plurality of small protruding parts 18*b* of the elastic body layer 14, the charging properties and surface unevenness can be maintained.

A distance d1 between the large protruding parts 18*a* is not particularly limited, but the distance d1 is preferably 25 μm or more and 55 μm or less. When the distance d1 between the large protruding parts 18*a* is within the above range, it is possible to form moderate surface unevenness (roughness) with the plurality of large protruding parts 18*a*. Then, when the distance d1 between the large protruding parts 18*a* is 25 μm or more, sufficient surface unevenness (roughness) is ensured, so excellent discharge properties are maintained and the charging properties are excellent. By doing so, it is easy to suppress the occurrence of a fog image. Further, from this viewpoint, the distance d1 between the large protruding parts 18*a* is preferably 27 μm or more, and more preferably 30 μm or more. Then, when the distance d1 between the large protruding parts 18*a* is 55 μm or less, sufficient surface unevenness (roughness) is ensured, so the integration between the elastic body layer 14 and the surface layer 16 is enhanced, and peeling of the surface layer 16 is easily suppressed. In addition, from this viewpoint, the distance d1 between the large protruding parts 18*a* is preferably 50 μm or less, and more preferably 45 μm or less.

A distance d2 between the small protruding parts 18*b* is not particularly limited, but the distance d2 is preferably 0.4 μm or more and 3.8 μm or less. When the distance d2 between the small protruding parts 18*b* is within the above range, it is possible to appropriately disperse the plurality of small protruding parts 18*b* on the surface of the large protruding part 18*a*. Then, when the distance d2 between the small protruding parts 18*b* is 0.4 μm or more, the surface layer 16 can be easily formed along the uneven surface formed by the plurality of small protruding parts 18*b*, and the surface layer 16 can be covered without filling the unevenness of the elastic body layer 14 caused by the plurality of small protruding parts 18*b*. Further, the integration between the elastic body layer 14 and the surface layer 16 is enhanced, and peeling of the surface layer 16 is easily suppressed. In addition, from this viewpoint, the distance d2 between the small protruding parts 18*b* is preferably 0.5 μm or more, more preferably 0.7 μm or more, and even more preferably 1.0 μm or more. Then, when the distance d2 between the small protruding parts 18*b* is 3.8 μm or less, the plurality of small protruding parts 18*b* are appropriately dispersed on the surface of the large protruding part 18*a*, so the stress applied to the small protruding parts 18*b* is appropriately dispersed, and tearing/breakage of the small protruding parts 18*b* is easily suppressed. In addition, from this viewpoint, the distance d2 between the small protruding parts 18*b* is preferably 3.5 μm or less, and more preferably 3.0 μm or less.

A concave portion is formed between the large protruding parts 18*a*. The bottom surface of this concave portion may be a flat portion or a curved portion. In addition, on the bottom surface of the concave portion, that is, the surface between the large protruding parts 18*a*, the plurality of small protruding parts 18*b* forming unevenness having a ten-point average roughness Rz of 1.0 μm or more and 6.0 μm or less may be formed. The plurality of small protruding parts 18*b* forming unevenness having a ten-point average roughness Rz of 1.0 μm or more and 6.0 μm or less are formed between the large protruding parts 18*a* on the uneven surface shown in FIG. 2. Then, when the ten-point average roughness Rz is 1.0 μm or more, the integration between the elastic body layer 14 and the surface layer 16 is enhanced, and peeling of the surface layer 16 is easily suppressed. Further, from this viewpoint, the ten-point average roughness Rz is more preferably 1.5 μm or more, and even more preferably 2.0 μm or more. On the other hand, when the ten-point average roughness Rz is 6.0 μm or less, the discharge properties can be improved. In addition, from this viewpoint, the ten-point average roughness Rz is more preferably 5.5 μm or less, and even more preferably 5.0 μm or less.

The elastic body layer 14 has the plurality of large protruding parts 18*a* and the plurality of small protruding parts 18*b* on the outer circumferential surface, so that the outer circumferential surface has a large surface area. The surface area ratio $S/S_0$ of the elastic body layer 14 is not particularly limited, but is preferably 2.2 or more and 7.7 or less. When the surface area ratio $S/S_0$ is within the above range, the elastic body layer 14 has moderate surface unevenness (roughness) due to the plurality of large protruding parts 18*a* and the plurality of small protruding parts 18*b*, so the integration between the elastic body layer 14 and the surface layer 16 is enhanced, and peeling of the surface layer 16 is easily suppressed. Also, excellent discharge properties can be maintained. By doing so, it is easy to suppress the occurrence of a fog image. The surface area ratio $S/S_0$ is more preferably 2.5 or more and 7.0 or less, and even more preferably 3.0 or more and 6.0 or less. Here, S is the measured surface area of the elastic body layer 14, and $S_0$ is the theoretical surface area when the surface of the elastic body layer 14 is assumed to be flat.

The elastic body layer 14 preferably has a hydroxy group or a hydroperoxy group formed on the outer circumferential surface. By doing so, the affinity between the elastic body layer 14 and the urethane polymer is improved, the surface layer 16 can be easily formed along the uneven surface formed by the plurality of small protruding parts 18*b* of the elastic body layer 14, and the surface layer 16 can be covered without filling the unevenness. In addition, the integration between the elastic body layer 14 and the surface layer 16 is enhanced, and peeling of the surface layer 16 is easily suppressed. For example, when the outer circumferential surface of the elastic body layer 14 is subjected to excimer treatment or corona treatment, a hydroxy group or a hydroperoxy group can be formed on the outer circumferential surface of the elastic body layer 14.

From the viewpoint of easily suppressing contamination of the roll surface due to toner crushing, the surface hardness (MD-1 hardness) of the elastic body layer 14 is preferably in the range of 30 to 55 degrees. The elastic body layer 14 can be configured to have a lower hardness by including silicone rubber.

The thickness of the surface layer 16 is preferably 0.1 μm or more and 2.0 μm or less. When the thickness of the surface layer 16 is 0.1 μm or more, discharge from the elastic body layer 14 can be suppressed, and the charging properties can be improved. Further, from this viewpoint, the thickness of the surface layer 16 is more preferably 0.2 μm or more, and even more preferably 0.5 μm or more. On the other hand, when the thickness of the surface layer 16 is 2.0 μm or less, the surface roughness of the elastic body layer 14 can be maintained without filling the surface unevenness. In addition, from this viewpoint, the thickness of the surface layer 16 is more preferably 1.7 μm or less, and even more preferably 1.5 μm or less. When the elastic body layer 14 is subjected to surface treatment, the affinity between the urethane polymer constituting the surface layer 16 and the elastic body layer 14 is improved, and it is easy to form the surface layer 16 thinner on the surface of the elastic body layer 14. In addition, when the small protruding parts 18*b* of the elastic body layer 14 are appropriately dispersed, the urethane polymer constituting the surface layer 16 easily permeates between the small protruding parts 18*b*, so it is easy to form the surface layer 16 without filling the concave portion formed by the small protruding parts 18.

The urethane polymer constituting the surface layer 16 preferably has an NCO index of 100 or more and 150 or less. By setting the NCO index lower, the elongation of the material increases, so the elongation at breakage and hardness of the surface layer 16 containing the urethane polymer can be brought close to the elongation at breakage and hardness of the elastic body layer 14 containing silicone rubber to enhance the integration between the elastic body layer 14 and the surface layer 16. Moreover, the elongation at breakage of the surface layer 16 is easily kept within a specific range. When the NCO index is 100 or more, the surface layer 16 is not too soft, and the elastic body layer 14 easily follows the surface layer 16. Further, when the NCO index is 150 or less, the surface layer 16 is not too hard, and the surface layer 16 easily follows the elastic body layer 14. In this way, it is easy to suppress tearing/breakage of the elastic body layer 14, and it is easy to suppress peeling of the surface layer 16. From the above viewpoint, the NCO index of the urethane polymer is more preferably 110 or more and 140 or less, and even more preferably 120 or more and 135 or less. The NCO index is expressed in equivalents of isocyanate groups of isocyanate per 100 total equivalents of hydroxyl groups of polyol.

The urethane polymer constituting the surface layer 16 can be formed from a urethane composition containing polyol and isocyanate. The urethane composition may be composed of only a thermosetting urethane polymer, or may contain a thermoplastic urethane polymer in addition to the thermosetting urethane polymer. When the thermoplastic urethane polymer is included, the elongation of the material increases, so the elongation at breakage and hardness of the surface layer 16 containing the urethane polymer can be brought close to the elongation at breakage and hardness of the elastic body layer 14 containing silicone rubber to easily enhance the integration between the elastic body layer 14 and the surface layer 16. Moreover, the elongation at breakage of the surface layer 16 can be easily kept within a specific range.

The thermoplastic urethane polymer may include, for example, a caprolactone type, an adipate type, and an ether type. Among these, the caprolactone type is preferable from the viewpoint of ensuring high mechanical strength and elastic recovery. Thus, high mechanical strength can be obtained with low hardness. Moreover, from the viewpoint of ensuring coatability, the molecular weight is preferably relatively large. A preferred molecular weight range is from 10,000 to 500,000.

The mixing ratio of the thermosetting urethane polymer and the thermoplastic urethane polymer (thermosetting urethane polymer/thermoplastic urethane polymer) is preferably in a range of 20/80 to 80/20 in mass ratio. When the mixing ratio is within this range, the balance between coatability, low hardness, and settling resistance is excellent. More preferably, the mixing ratio is within a range of 40/60 to 60/40.

The polyol constituting the urethane polymer preferably has 2 to 3 functional groups. More preferably, the polyol has two functional groups. When the number of functional groups of the polyol constituting the urethane polymer is 2, the hardness of the surface layer 16 is suppressed and the integration between the elastic body layer 14 and the surface layer 16 is enhanced, so peeling of the surface layer 16 is easily suppressed. The polyol constituting the urethane polymer preferably has a molecular weight of 100 to 1,000, 100 to 750, 100 to 500, etc. from the viewpoint of permeability into the elastic body layer 14.

The polyol constituting the urethane polymer may include, for example, diols such as ethylene glycol, diethylene glycol, triethylene glycol, propylene glycol, polypropylene glycol, dipropylene glycol, butylene glycol, neopentyl glycol, and 1,6-hexylene glycol, and triols such as trimethylolethane, trimethylolpropane, hexanetriol, and glycerin. These may be used singly or in combination of two or more as the polyol constituting the urethane polymer. Among these, diols such as 1,6-hexylene glycol are particularly preferable from the viewpoint of ease of control of the crosslinking reaction.

The isocyanate constituting the urethane polymer preferably has 2 to 3 functional groups. More preferably, the isocyanate has two functional groups. When the number of functional groups of the isocyanate constituting the urethane polymer is 2, the hardness of the surface layer 16 is suppressed and the integration between the elastic body layer 14 and the surface layer 16 is enhanced, so peeling of the surface layer 16 is easily suppressed. The isocyanate constituting the urethane polymer may be a prepolymer having an isocyanate group at a terminal, or may not be a prepolymer. The isocyanate constituting the urethane polymer preferably has a molecular weight of 100 to 1,000, 100 to 750, 100 to 500, etc. from the viewpoint of permeability into the elastic body layer 14.

The isocyanate constituting the urethane polymer may include, for example, 4,4'-diphenylmethane diisocyanate (MDI), isophorone diisocyanate (IPDI), 4,4'-dicyclohexylmethane diisocyanate (hydrogenated MDI), trimethylhexamethylene diisocyanate (TMHDI), tolylene diisocyanate (TDI), carbodiimide-modified MDI, polymethylenephenyl isocyanate (PAPI), orthotoluidine diisocyanate (TODI), naphthylene diisocyanate (NDI), xylene diisocyanate (XDI), hexamethylene diisocyanate (HMDI), paraphenylene diisocyanate (PDI), lysine diisocyanate methyl ester (LDI), dimethyl diisocyanate (DDI), and the like. These may be used singly or in combination of two or more as the isocyanate constituting the urethane polymer. Among these, HMDI is particularly preferable from the viewpoint of ease of control of the crosslinking reaction.

The urethane composition may contain a solvent along with the urethane composition containing polyol and isocyanate. By including the solvent, the solid content concentration can be adjusted, and the thickness of the surface layer 16 can be adjusted. Moreover, it becomes easy to form the surface layer 16 more uniformly. The solid content concentration in the urethane composition is preferably in a range of 1% by mass or more and 40% by mass or less from the viewpoint of permeability, thickness, etc. More preferably, the solid content concentration is 3% by mass or more and 35% by mass or less.

The solvent may include, for example, acetone, methyl ethyl ketone, methyl isobutyl ketone, xylene, hexane, petroleum ether, normal hexane, cyclohexane, benzene, toluene, methyl acetate, ethyl acetate, butyl acetate, ethyl ether, dichloromethane, tetrahydrofuran, gasoline, petroleum ether, benzine, dimethylformamide, and the like. These may be used singly or in combination of two or more as the solvent. Among these, methyl ethyl ketone (MEK) is particularly preferable from the viewpoint of material solubility and volatility.

A conductive agent can be added to the elastic body layer 14 to impart conductivity. The conductive agent may include, for example, an electronic conductive agent and an ionic conductive agent. The electronic conductive agent may include, for example, carbon black, graphite, and conductive metal oxide. The conductive metal oxide may include, for example, conductive titanium oxide, conductive zinc oxide, conductive tin oxide, and the like. The ionic conductive agent may include, for example, quaternary ammonium salt, borate, surfactant, and the like. Moreover, various additives may be appropriately added to the elastic body layer 14 as required. The additives may include, for example, lubricants, vulcanization accelerators, antioxidants, light stabilizers, viscosity modifiers, processing aids, flame retardants, plasticizers, foaming agents, fillers, dispersants, antifoaming agents, pigments, release agents, and the like.

The elastic body layer 14 can be adjusted to have a predetermined volume resistivity by adjusting the amount of the ionic conductive agent added and adding the electronic conductive agent, and the like. The volume resistivity of the elastic body layer 14 may be appropriately set within a range of $10^2$ to $10^{10}$ Ω·cm, $10^3$ to $10^9$ Ω·cm, and $10^4$ to $10^8$ Ω·cm.

The thickness of the elastic body layer 14 is not particularly limited, and may be appropriately set within a range of 0.1 to 10 mm.

A conductive agent can be added to the surface layer 16 to impart conductivity. The conductive agent may include, for example, an electronic conductive agent and an ionic conductive agent. The electronic conductive agent may include, for example, carbon black, graphite, and conductive metal oxide. The conductive metal oxide may include, for example, conductive titanium oxide, conductive zinc oxide, conductive tin oxide, and the like. The ionic conductive agent may include, for example, quaternary ammonium salt, borate, surfactant, and the like. Moreover, various additives may be appropriately added to the surface layer 16 as required. The additives may include, for example, plasticizers, leveling agents, fillers, vulcanization accelerators, processing aids, release agents, and the like.

The volume resistivity of the surface layer 16 is preferably set in a semi-conductive region from the viewpoint of charging properties. Specifically, for example, the volume resistivity may be set within a range of $1.0\times10^7$ to $1.0\times10^{10}$ Ω·cm. The volume resistivity can be measured according to JIS K6911.

The elastic body layer 14 can be formed by placing the shaft body 12 coaxially in a hollow part of a roll molding mold, injecting an uncrosslinked silicone rubber composition, heating and curing (crosslinking), and then demolding. The large protruding parts 18*a* of the elastic body layer 14 can be formed by mold transfer. A predetermined uneven shape is preferably formed on the inner side of the roll molding mold (inner surface of the mold). The small protruding parts 18*b* of the elastic body layer 14 can be formed by applying surface treatment to the outer circumferential surface of the elastic body layer 14. Such surface treatment may include, for example, corona treatment, plasma treatment, UV treatment, electron beam treatment, excimer treatment, flame treatment, and the like. Among these, excimer treatment, corona treatment, and the like are preferable from the viewpoint of forming fine unevenness. In addition, functional groups such as hydroxyl groups and hydroperoxy groups can be formed on the outer circumferential surface of the elastic body layer 14 by surface treatment. These functional groups contribute to adhesion between the material of the elastic body layer 14 and the material of the surface layer 16. In addition, it is easy for the material of the surface layer 16 to enter the concave portion of the fine surface unevenness formed by the large protruding parts 18*a* and the small protruding parts 18*b*, and it is easy to form the thin surface layer 16 by maintaining the fine surface unevenness on the outer circumferential surface of the elastic body layer 14.

The surface layer 16 can be formed by using a material for forming the surface layer 16, applying the material to the outer circumferential surface of the elastic body layer 14, and performing drying treatment or the like as appropriate. The surface layer 16 can be formed along the uneven surface formed by the plurality of small protruding parts 18*b* of the elastic body layer 14.

According to the charging roll 10 configured as described above, the charging roll 10 includes the shaft body 12, the elastic body layer 14 formed on the outer circumferential surface of the shaft body 12, and the surface layer 16 formed on the outer circumferential surface of the elastic body layer 14. The elastic body layer 14 contains a silicone polymer, and includes the plurality of large protruding parts 18*a* having a width of 13 μm or more and 48 μm or less and a height of 5 μm or more and 13 μm or less on the outer circumferential surface of the elastic body layer 14, and the plurality of small protruding parts 18*b* forming unevenness having a ten-point average roughness Rz of 1.0 μm or more and 6.0 μm or less on the surface of the large protruding parts 18*a*. The surface layer 16 contains a urethane polymer, and since the elongation at breakage of the surface layer 16 is 285% or more and 525% or less, the charging roll 10 suppresses toner contamination, tearing/breakage of the elastic body layer 14, and peeling of the surface layer 16, and has excellent charging properties.

Although the embodiments of the disclosure have been described above, the disclosure is by no means limited to the above-described embodiments, and various modifications can be made without departing from the scope of the disclosure.

For example, although the large protruding part 18*a* is shown as having a hemispherical cross section in FIG. 2, the shape of the large protruding part 18*a* is not particularly limited. Various shapes such as a hemispherical cross section, a triangular cross section, and a square cross section are possible. In addition, the plurality of large protruding parts 18*a* may be scattered like islands on the outer circumferential surface of the elastic body layer 14, or may be formed as continuous filaments in the axial direction, the circumferential direction, or a direction therebetween of the charging roll, for example.

EXAMPLE

The disclosure will be described in detail below using examples and comparative examples.

Example 1

<Preparation of Elastic Body Layer Composition>

An elastic body layer composition was prepared by mixing conductive silicone rubber ("X-34-264A/B" manufactured by Shin-Etsu Chemical Co., Ltd., mixing mass ratio A/B=1/1) with a static mixer.

<Production of Elastic Body Layer>

The elastic body layer composition was injected into a cylindrical mold coaxially set with a conductive shaft (φ6 mm), heated at 150° C. for 30 minutes, then cooled, and demolded. As a result, a roll body having an elastic body layer with a thickness of 3 mm on the outer circumference of the conductive shaft was produced. An uneven shape was formed on the inner side of the mold, and a plurality of large protruding parts were formed on the outer circumferential surface of the roll body by mold transfer. The plurality of large protruding parts were scattered like islands on the outer circumferential surface of the roll body.

<Surface Treatment for Elastic Body Layer>

A plurality of small protruding parts were formed on the surface of the plurality of large protruding parts by applying excimer treatment (600 mW/cm$^2$, irradiation for 120 seconds) to the outer circumferential surface of the produced roll body. The plurality of small protruding parts were scattered like islands on the surface of the large protruding parts and in the concave portion between the large protruding parts.

<Preparation of Surface Layer Composition>

A surface layer composition was prepared by kneading 50 parts by mass of a thermoplastic urethane polymer ("N5196" manufactured by Nippon Polyurethane), 30 parts by mass of ether-based polyol ("PPG2000" manufactured by Sanyo Kasei), 20 parts by mass of isocyanate ("Burnock DN955" manufactured by DIC Corporation), 30 parts by mass of an electronic conductive agent ("Denka Black" manufactured by Denki Kagaku Kogyo Co., Ltd.), and 1 part by mass of an ionic conductive agent (quaternary ammonium salt) in a ball mill, then adding 400 parts by mass of MEK, and mixing and stirring.

<Production of Surface Layer>

The surface layer composition was applied to the outer circumferential surface of the elastic body layer after the surface treatment by a roll coating method, and then heat-treated at 170° C. for 60 minutes to form a surface layer. As a result, a charging roll was produced.

Examples 2 to 14 and 21 to 26, Comparative Examples 1 to 8

A roll body was produced in the same manner as in Example 1, except that the uneven shape on the inner side of the mold was changed. Next, the surface treatment for the elastic body layer and the production of the surface layer were performed in the same manner as in Example 1 to produce a charging roll.

Example 15

A roll body was produced in the same manner as in Example 1, except that the uneven shape on the inner side of the mold was changed. Next, the surface treatment method for the elastic body layer was changed, and the surface layer was produced in the same manner as in Example 1 to produce a charging roll.

Examples 16 to 17, Comparative Examples 9 to 10

A roll body was produced in the same manner as in Example 1, except that the uneven shape on the inner side of the mold was changed. Next, the surface treatment for the elastic body layer was performed in the same manner as in Example 1. Next, the composition of the surface layer composition was changed, and the surface layer was produced to produce a charging roll.

Examples 18 to 19 and 28 to 29

A roll body was produced in the same manner as in Example 1, except that the uneven shape on the inner side of the mold was changed. Next, the surface treatment for the elastic body layer was performed in the same manner as in Example 1. Next, the thickness of the surface layer was changed, and the surface layer was produced to produce a charging roll.

Examples 20 and 30

A roll body was produced in the same manner as in Example 1, except that the uneven shape on the inner side of the mold was changed. Next, the surface treatment for the elastic body layer was performed in the same manner as in Example 1. Next, in the preparation of the surface layer composition, the polyol was changed from an ether-based polyol ("PPG2000" manufactured by Sanyo Kasei) to an ethylenediamine-based polyol ("Newpol NP-300" manufactured by Sanyo Kasei), and the surface layer was produced to produce a charging roll.

Example 27

A roll body was produced in the same manner as in Example 1, except that the uneven shape on the inner side of the mold was changed. Next, the surface layer was produced in the same manner as in Example 1 without performing the surface treatment for the elastic body layer, to produce a charging roll.

The uneven shape of the elastic body layer of the charging roll was investigated. The elongation at breakage of the surface layer material and the thickness of the surface layer were also measured. Further, the tearing weakness of the elastic body layer of the charging roll, peeling of the surface layer, charging properties, and contamination were evaluated.

(Width of Large Protruding Part)

The surface of the elastic body layer before formation of the surface layer was photographed at a magnification of 3000 at three positions, 5 mm axially inward from both ends and the axial center of the surface, using a laser microscope ("VK-X100" manufactured by KEYENCE). In mode plane measurement, a measurement line was drawn between the top of any large protruding part and the bottom of the adjacent concave portion, and the measured planar distance was doubled to obtain the width of the any large protruding part. The measurement was performed on any three large protruding parts at one location, and the average value of nine points in total, three at three locations each, was taken as the width of the large protruding part.

(Height of Large Protruding Part)

The surface of the elastic body layer before formation of the surface layer was photographed at a magnification of 3000 at three positions, 5 mm axially inward from both ends and the axial center of the surface, using a laser microscope ("VK-X100" manufactured by KEYENCE). In mode profile measurement, a measurement line passing through the top of any large protruding part was drawn, and in the measured height profile, height smoothing was performed to remove noise, and further the slope of the graph was corrected. The top of any large protruding part and the bottom of the adjacent concave portion were selected, and the numerical value of the obtained height difference was taken as the height of the any protruding part. The measurement was performed on any three large protruding parts at one location, and the average value of nine points in total, three at three locations each, was taken as the height of the large protruding part.

(Roughness Rz of Surface of Large Protruding Part)

The surface of the elastic body layer before formation of the surface layer was photographed at a magnification of 3000 at three positions, 5 mm axially inward from both ends and the axial center of the surface, using a laser microscope ("VK-X100" manufactured by KEYENCE). From the photographed image, any large protruding parts at three locations were selected by line roughness measurement in the roughness measurement (according to JIS B 0601-1994) mode, and the ten-point average roughness Rz of the surface was measured. The average value of nine points in total, three at three locations each, was taken as the roughness Rz of the surface of the large protruding part. The measurement distance was 4 to 6 μm.

(Inter-Protrusion Distance Between Large Protruding Parts)

The surface of the elastic body layer before formation of the surface layer was photographed at a magnification of 3000 at three positions, 5 mm axially inward from both ends and the axial center of the surface, using a laser microscope ("VK-X100" manufactured by KEYENCE). In mode plane measurement, a measurement line was drawn between the top of any large protruding part and the top of the adjacent protruding part, and the measured planar distance was taken as the inter-protrusion distance. The measurement was performed between any three large protruding parts at one location, and the average value of nine points in total, three at three locations each, was taken as the inter-protrusion distance between the large protruding parts.

(Inter-Protrusion Distance Between Small Protruding Parts)

The surface of the elastic body layer before formation of the surface layer was photographed at a magnification of 3000 at three positions, 5 mm axially inward from both ends and the axial center of the surface, using a laser microscope ("VK-X100" manufactured by KEYENCE). A profile was obtained by drawing a measurement line on the side surface of any large protruding part in the profile measurement mode. Adjacent small protruding parts were selected from the profile, and the planar distance thereof was measured. The above was performed between any three small protruding parts, and the average value of nine points in total, three at three locations each, was taken as the inter-protrusion distance between the small protruding parts.

(Surface Roughness Rz of Concave Portion)

The surface roughness Rz is a ten-point average roughness, and is the average value of values measured at any five points in accordance with JIS B0601 (1994). The surface roughness Rz of the concave portion between the large protruding parts was measured by observation using a laser microscope ("VK-9510" manufactured by KEYENCE). In the photographed image, a value calculated by selecting a groove of 0.01 $mm^2$ in the surface roughness mode in an analysis program (program name: KEYENCE VK Analyzer analysis application) was taken as the surface roughness Rz of the concave portion.

(Method for Measuring Surface Area Ratio $S/S_0$)

The surface of the elastic body layer before formation of the surface layer was photographed at a magnification of 3000 at three positions, 5 mm axially inward from both ends and the axial center of the surface, using a laser microscope ("VK-X100" manufactured by KEYENCE). The surface area S in the range of 0.4 $mm^2$ was obtained by mode volume surface measurement, and the surface area ratio was obtained by dividing the surface area S by $S_0$ ($S/S_0$). S is the measured surface area of the elastic body layer, and $S_0$ is the theoretical surface area when the surface of the elastic body layer is assumed to be flat.

(Elongation at Breakage)

Press crosslinking molding was performed at 170° C. for 60 minutes using the surface layer composition to obtain a sheet-like sample with a thickness of 2 mm. The obtained sheet-like sample was measured for elongation at breakage according to JIS K6251 using a tensile tester ("AE-F Strograph" manufactured by Toyo Seiki Seisaku-sho, Ltd.).

(Thickness of Surface Layer)

Measurement was performed by observing a radial cross section of the surface layer at a magnification of 400 using a laser microscope ("VK-X100" manufactured by KEYENCE). The thickness of the urethane polymer covering the small protruding parts was measured. The thickness was measured at any five locations and represented by the average.

(Tearing of Elastic Body Layer)

The produced charging roll was attached to a cartridge (black) of an actual machine ("CLJ4525dn" manufactured by HP), and after running 30,000 sheets in an environment of 15° C.×10% RH, the appearance of the roll was visually observed. At this time, if tearing of the elastic body layer of the charging roll was confirmed and the image was affected, the charging roll was evaluated as poor "×"; if slight tearing at the end of the elastic body layer was confirmed but the image was not affected, the charging roll was evaluated as good "○"; and if no tearing was confirmed and the image was not affected, the charging roll was evaluated as very good "◎".

(Peeling of Surface Layer)

The produced charging roll was attached to a cartridge (black) of an actual machine ("CLJ4525dn" manufactured by HP), and after running 30,000 sheets in an environment of 15° C.×10% RH, the appearance of the roll was visually observed. At this time, if peeling of the surface layer of the charging roll was confirmed and the image was affected, the charging roll was evaluated as poor "×"; if slight peeling at the end of the surface layer was confirmed but the image was not affected, the charging roll was evaluated as good "○"; and if no peeling was confirmed and the image was not affected, the charging roll was evaluated as very good "◎".

(Charging Properties)

The produced charging roll was attached to a cartridge (black) of an actual machine ("CLJ4525dn" manufactured by HP), images were produced by 25% density halftone in an environment of 15° C.×10% RH, and evaluation was performed after running 30,000 sheets. An image without black dots (fogging) was evaluated as very good "◎", an image with black dots that were light in density and acceptable was evaluated as good "○", and an image with black dots having unacceptable density was evaluated as poor "×".

(Roll Contamination)

The produced charging roll was attached to a cartridge (black) of an actual machine ("CLJ4525dn" manufactured by HP), and after running 30,000 sheets in an environment of 15° C.×10% RH, the appearance of the roll was visually observed. At this time, if the toner contamination was rubbed on the roll surface and caused defects in the image, the charging roll was evaluated as poor "×"; if the toner contamination was rubbed on the roll surface but the amount was very small and the defects in the image were within an acceptable range, the charging roll was evaluated as good "○"; and if no toner contamination was rubbed on the roll surface and the image had no defect, the charging roll was evaluated as very good "◎".

TABLE 1

| | | Example | | | | | | | | | |
|---|---|---|---|---|---|---|---|---|---|---|---|
| | | 1 | 2 | 3 | 4 | 5 | 6 | 7 | 8 | 9 | 10 |
| Elastic body layer | Width of large protruding part (μm) | 48 | 13 | 35 | 35 | 35 | 35 | 35 | 35 | 35 | 35 |
| | Height of large protruding part (μm) | 7 | 7 | 13 | 5 | 7 | 7 | 7 | 7 | 7 | 7 |
| | Roughness Rz of large protruding part surface (μm) | 4.0 | 4.0 | 4.0 | 4.0 | 6.0 | 1.0 | 4.0 | 4.0 | 4.0 | 4.0 |
| | Inter-protrusion distance between large protruding parts (μm) | 37 | 37 | 37 | 37 | 37 | 37 | 55 | 25 | 37 | 37 |
| | Inter-protrusion distance between small protruding parts (μm) | 1.9 | 1.9 | 1.9 | 1.9 | 1.9 | 1.9 | 1.9 | 1.9 | 3.8 | 0.4 |
| | Roughness Rz of concave portion (μm) | 3.2 | 3.2 | 3.2 | 3.2 | 3.2 | 3.2 | 3.2 | 3.2 | 3.2 | 3.2 |
| | Surface area ratio $S/S_0$ | 3.1 | 4.3 | 4.2 | 3.5 | 4.6 | 3.1 | 3.4 | 4.3 | 3.0 | 4.7 |
| | Surface treatment for elastic body layer | excimer | excimer | excimer | excimer | excimer | excimer | excimer | excimer | excimer | excimer |
| | Functional groups of elastic body layer surface | Yes | Yes | Yes | Yes | Yes | Yes | Yes | Yes | Yes | Yes |

TABLE 1-continued

| | | Example | | | | | | | | | |
|---|---|---|---|---|---|---|---|---|---|---|---|
| | | 1 | 2 | 3 | 4 | 5 | 6 | 7 | 8 | 9 | 10 |
| Surface layer composition | Thermoplastic urethane (parts by mass) | 50 | 50 | 50 | 50 | 50 | 50 | 50 | 50 | 50 | 50 |
| | Polyol (parts by mass) | 30 | 30 | 30 | 30 | 30 | 30 | 30 | 30 | 30 | 30 |
| | Isocyanate (parts by mass) | 20 | 20 | 20 | 20 | 20 | 20 | 20 | 20 | 20 | 20 |
| | Electronic conductive agent (parts by mass) | 30 | 30 | 30 | 30 | 30 | 30 | 30 | 30 | 30 | 30 |
| | Ionic conductive agent (parts by mass) | 1 | 1 | 1 | 1 | 1 | 1 | 1 | 1 | 1 | 1 |
| Surface layer configuration | Elongation at breakage (%) | 344 | 344 | 344 | 344 | 344 | 344 | 344 | 344 | 344 | 344 |
| | NCO index | 140 | 140 | 140 | 140 | 140 | 140 | 140 | 140 | 140 | 140 |
| | Surface layer thickness (μm) | 1.0 | 1.0 | 1.0 | 1.0 | 1.0 | 1.0 | 1.0 | 1.0 | 1.0 | 1.0 |
| | Number of polyol functional groups | 2 | 2 | 2 | 2 | 2 | 2 | 2 | 2 | 2 | 2 |
| Evaluation | Tearing | ○ | ○ | ○ | ◎ | ○ | ◎ | ◎ | ◎ | ◎ | ◎ |
| | Peeling | ◎ | ◎ | ◎ | ◎ | ◎ | ○ | ◎ | ◎ | ◎ | ◎ |
| | Charging properties | ◎ | ◎ | ○ | ○ | ◎ | ◎ | ◎ | ◎ | ◎ | ◎ |
| | Contamination | ◎ | ◎ | ◎ | ◎ | ◎ | ◎ | ◎ | ◎ | ◎ | ◎ |

TABLE 2

| | | Example | | | | | | | | | |
|---|---|---|---|---|---|---|---|---|---|---|---|
| | | 11 | 12 | 13 | 14 | 15 | 16 | 17 | 18 | 19 | 20 |
| Elastic body layer | Width of large protruding part (μm) | 35 | 35 | 13 | 48 | 35 | 35 | 35 | 35 | 35 | 35 |
| | Height of large protruding part (μm) | 7 | 7 | 13 | 5 | 7 | 7 | 7 | 7 | 7 | 7 |
| | Roughness Rz of large protruding part surface (μm) | 4.0 | 4.0 | 6.0 | 1.0 | 4.0 | 4.0 | 4.0 | 4.0 | 4.0 | 4.0 |
| | Inter-protrusion distance between large protruding parts (μm) | 37 | 37 | 25 | 55 | 37 | 37 | 37 | 37 | 37 | 37 |
| | Inter-protrusion distance between small protruding parts (μm) | 1.9 | 1.9 | 0.4 | 3.8 | 1.9 | 1.9 | 1.9 | 1.9 | 1.9 | 1.9 |
| | Roughness Rz of concave portion (μm) | 6.0 | 1.0 | 6.0 | 1.0 | 3.2 | 3.2 | 3.2 | 3.2 | 3.2 | 3.2 |
| | Surface area ratio $S/S_0$ | 4.3 | 3.2 | 7.7 | 2.2 | 3.9 | 3.9 | 3.9 | 3.6 | 4.1 | 3.9 |
| | Surface treatment for elastic body layer | excimer | excimer | excimer | excimer | corona | excimer | excimer | excimer | excimer | excimer |
| | Functional groups of elastic body layer surface | Yes | Yes | Yes | Yes | Yes | Yes | Yes | Yes | Yes | Yes |
| Surface layer composition | Thermoplastic urethane (parts by mass) | 50 | 50 | 50 | 50 | 50 | 50 | 50 | 50 | 50 | 50 |
| | Polyol (parts by mass) | 30 | 30 | 30 | 30 | 30 | 33 | 27 | 30 | 30 | 30 |
| | Isocyanate (parts by mass) | 20 | 20 | 20 | 20 | 20 | 17 | 23 | 20 | 20 | 20 |
| | Electronic conductive agent (parts by mass) | 30 | 30 | 30 | 30 | 30 | 30 | 30 | 30 | 30 | 30 |
| | Ionic conductive agent (parts by mass) | 1 | 1 | 1 | 1 | 1 | 1 | 1 | 1 | 1 | 1 |
| Surface layer configuration | Elongation at breakage (%) | 344 | 344 | 344 | 344 | 344 | 525 | 285 | 344 | 344 | 344 |
| | NCO index | 140 | 140 | 140 | 140 | 140 | 120 | 155 | 140 | 140 | 140 |
| | Surface layer thickness (μm) | 1.0 | 1.0 | 1.0 | 1.0 | 1.0 | 1.0 | 1.0 | 2.0 | 0.1 | 1.0 |
| | Number of polyol functional groups | 2 | 2 | 2 | 2 | 2 | 2 | 2 | 2 | 2 | 3 |
| Evaluation | Tearing | ◎ | ◎ | ○ | ○ | ◎ | ◎ | ○ | ◎ | ◎ | ◎ |
| | Peeling | ◎ | ◎ | ◎ | ○ | ◎ | ○ | ◎ | ◎ | ◎ | ◎ |
| | Charging properties | ◎ | ◎ | ○ | ○ | ◎ | ◎ | ◎ | ◎ | ◎ | ◎ |
| | Contamination | ◎ | ◎ | ◎ | ◎ | ◎ | ◎ | ○ | ◎ | ◎ | ◎ |

TABLE 3

| | | Example | | | | | | | | | |
|---|---|---|---|---|---|---|---|---|---|---|---|
| | | 21 | 22 | 23 | 24 | 25 | 26 | 27 | 28 | 29 | 30 |
| Elastic body layer | Width of large protruding part (μm) | 35 | 35 | 35 | 34 | 35 | 35 | 35 | 35 | 35 | 35 |
| | Height of large protruding part (μm) | 7 | 7 | 7 | 7 | 7 | 7 | 7 | 7 | 7 | 7 |
| | Roughness Rz of large protruding part surface (μm) | 4.0 | 4.0 | 4.0 | 4.0 | 4.0 | 4.0 | 4.0 | 4.0 | 4.0 | 4.0 |
| | Inter-protrusion distance between large protruding parts (μm) | 59 | 22 | 37 | 37 | 37 | 37 | 37 | 37 | 37 | 37 |

TABLE 3-continued

| | | Example | | | | | | | | | |
|---|---|---|---|---|---|---|---|---|---|---|---|
| | | 21 | 22 | 23 | 24 | 25 | 26 | 27 | 28 | 29 | 30 |
| | Inter-protrusion distance between small protruding parts (μm) | 1.9 | 1.9 | 4.0 | 0.3 | 1.9 | 1.9 | 1.9 | 1.9 | 1.9 | 1.9 |
| | Roughness Rz of concave portion (μm) | 3.2 | 3.2 | 3.2 | 3.2 | 6.3 | 0.8 | 3.2 | 3.2 | 3.2 | 3.2 |
| | Surface area ratio $S/S_0$ | 3.2 | 4.4 | 2.9 | 4.8 | 4.4 | 3.1 | 1.4 | 3.5 | 4.3 | 3.9 |
| | Surface treatment for elastic body layer | excimer | excimer | excimer | excimer | excimer | excimer | No | excimer | excimer | excimer |
| | Functional groups of elastic body layer surface | Yes | Yes | Yes | Yes | Yes | Yes | No | Yes | Yes | Yes |
| Surface layer composition | Thermoplastic urethane (parts by mass) | 50 | 50 | 50 | 50 | 50 | 50 | 50 | 50 | 50 | 50 |
| | Polyol (parts by mass) | 30 | 30 | 30 | 30 | 30 | 30 | 30 | 30 | 30 | 30 |
| | Isocyanate (parts by mass) | 20 | 20 | 20 | 20 | 20 | 20 | 20 | 20 | 20 | 20 |
| | Electronic conductive agent (parts by mass) | 30 | 30 | 30 | 30 | 30 | 30 | 30 | 30 | 30 | 30 |
| | Ionic conductive agent (parts by mass) | 1 | 1 | 1 | 1 | 1 | 1 | 1 | 1 | 1 | 1 |
| Surface layer configuration | Elongation at breakage (%) | 344 | 344 | 344 | 344 | 344 | 344 | 344 | 344 | 344 | 344 |
| | NCO index | 140 | 140 | 140 | 140 | 140 | 140 | 140 | 140 | 140 | 140 |
| | Surface layer thickness (μm) | 1.0 | 1.0 | 1.0 | 1.0 | 1.0 | 1.0 | 1.0 | 2.3 | 0.06 | 1.0 |
| | Number of polyol functional groups | 2 | 2 | 2 | 2 | 2 | 2 | 2 | 2 | 2 | 4 |
| Evaluation | Tearing | ⊚ | ⊚ | ○ | ⊚ | ⊚ | ⊚ | ○ | ○ | ⊚ | ⊚ |
| | Peeling | ○ | ⊚ | ⊚ | ○ | ⊚ | ○ | ○ | ⊚ | ⊚ | ⊚ |
| | Charging properties | ⊚ | ○ | ⊚ | ⊚ | ○ | ⊚ | ⊚ | ⊚ | ○ | ⊚ |
| | Contamination | ⊚ | ⊚ | ⊚ | ⊚ | ⊚ | ⊚ | ⊚ | ○ | ⊚ | ○ |

TABLE 4

| | | Comparative example | | | | | | | | | |
|---|---|---|---|---|---|---|---|---|---|---|---|
| | | 1 | 2 | 3 | 4 | 5 | 6 | 7 | 8 | 9 | 10 |
| Elastic body layer | Width of large protruding part (μm) | 50 | 12 | 35 | 35 | 35 | 35 | 12 | 50 | 35 | 35 |
| | Height of large protruding part (μm) | 7 | 7 | 14 | 4 | 7 | 7 | 14 | 4 | 7 | 7 |
| | Roughness Rz of large protruding part surface (μm) | 4.0 | 4.0 | 4.0 | 4.0 | 7.1 | 0.8 | 7.1 | 0.8 | 4.0 | 4.0 |
| | Inter-protrusion distance between large protruding parts (μm) | 37 | 37 | 37 | 37 | 37 | 37 | 22 | 59 | 37 | 37 |
| | Inter-protrusion distance between small protruding parts (μm) | 1.9 | 1.9 | 1.9 | 1.9 | 1.9 | 1.9 | 0.3 | 4.0 | 1.9 | 1.9 |
| | Roughness Rz of concave portion (μm) | 3.2 | 3.2 | 3.2 | 3.2 | 3.2 | 3.2 | 6.3 | 0.8 | 3.2 | 3.2 |
| | Surface area ratio $S/S_0$ | 3.0 | 4.4 | 4.8 | 3.3 | 4.8 | 3.0 | 8.0 | 1.9 | 3.9 | 3.9 |
| | Surface treatment for elastic body layer | excimer | excimer | excimer | excimer | excimer | excimer | excimer | excimer | excimer | excimer |
| | Functional groups of elastic body layer surface | Yes | Yes | Yes | Yes | Yes | Yes | Yes | Yes | Yes | Yes |
| Surface layer composition | Thermoplastic urethane (parts by mass) | 50 | 50 | 50 | 50 | 50 | 50 | 50 | 50 | 50 | 50 |
| | Polyol (parts by mass) | 30 | 30 | 30 | 30 | 30 | 30 | 30 | 30 | 35 | 25 |
| | Isocyanate (parts by mass) | 20 | 20 | 20 | 20 | 20 | 20 | 20 | 20 | 15 | 25 |
| | Electronic conductive agent (parts by mass) | 30 | 30 | 30 | 30 | 30 | 30 | 30 | 30 | 30 | 30 |
| | Ionic conductive agent (parts by mass) | 1 | 1 | 1 | 1 | 1 | 1 | 1 | 1 | 1 | 1 |
| Surface layer configuration | Elongation at breakage (%) | 344 | 344 | 344 | 344 | 344 | 344 | 344 | 344 | 551 | 262 |
| | NCO index | 140 | 140 | 140 | 140 | 140 | 140 | 140 | 140 | 115 | 170 |
| | Surface layer thickness (μm) | 1.0 | 1.0 | 1.0 | 1.0 | 1.0 | 1.0 | 1.0 | 1.0 | 1.0 | 1.0 |
| | Number of polyol functional groups | 2 | 2 | 2 | 2 | 2 | 2 | 2 | 2 | 2 | 2 |
| Evaluation | Tearing | X | X | X | ○ | X | ○ | X | X | ○ | X |
| | Peeling | ○ | ○ | ○ | ○ | ○ | X | ○ | X | X | ○ |
| | Charging properties | ○ | ○ | X | X | ○ | ○ | X | X | ○ | ○ |
| | Contamination | ○ | ○ | ○ | ○ | ○ | ○ | ○ | ○ | ○ | X |

In Comparative Example 1, since the width of the large protruding part was too large, the contact area of the large protruding part in contact with the photosensitive member via the surface layer was too large, and the large protruding part was torn and broken at the base. In Comparative Example 2, since the width of the large protruding part was too small, the effect of surface unevenness brought by the large protruding part was small, and the contact area of the elastic body layer in contact with the photosensitive member via the surface layer was too large, causing the elastic body layer to tear and break. In Comparative Example 3, since the height of the large protruding part was too large, the large protruding part was torn and broken at the base. In addition, as a result, the discharge properties deteriorated, and a black dot image was generated. In Comparative Example 4, since the height of the large protruding part was too small, the roughness was insufficient, and the charging was insufficient due to insufficient discharge, resulting in deterioration of the image. In Comparative Example 5, since the roughness of the surface of the large protruding part due to the small protruding part was too large, the small protruding part was torn and broken at the base. In Comparative Example 6, since the roughness of the surface of the large protruding part due to the small protruding part was too small, the integration between the elastic body layer and the surface layer was low, and the surface layer peeled off during durability. In Comparative Example 7, since the width of the large protruding part was too small, the effect of surface unevenness brought by the large protruding part was small, and the contact area of the elastic body layer in contact with the photosensitive member via the surface layer was too large, causing the elastic body layer to tear and break. Moreover, since the height of the large protruding part was too large, the large protruding part was torn and broken at the base. In addition, as a result, the discharge properties deteriorated, and a black dot image was generated. Moreover, since the roughness of the surface of the large protruding part due to the small protruding part was too large, the small protruding part was torn and broken at the base. In Comparative Example 8, since the width of the large protruding part was too large, the contact area of the large protruding part in contact with the photosensitive member via the surface layer was too large, and the large protruding part was torn and broken at the base. In addition, since the height of the large protruding part was too small, the roughness was insufficient, and the charging was insufficient due to insufficient discharge, resulting in deterioration of the image. In addition, since the roughness of the surface of the large protruding part due to the small protruding part was too small, the integration between the elastic body layer and the surface layer was low, and the surface layer peeled off during durability. In Comparative Example 9, the elongation at breakage of the surface layer was too large, and only the surface layer was stretched by the force received at the contact portion with the photosensitive member, and the elastic body layer did not follow the movement of the surface layer. Therefore, the surface layer peeled off during durability. On the other hand, in Comparative Example 10, the elongation at breakage of the surface layer was too small, and the surface layer did not follow the movement of the elastic body layer. Therefore, the elastic body layer was torn and broken during durability.

In contrast, in the examples, the elastic body layer contained a silicone polymer, and the outer circumferential surface of the elastic body layer was provided with a plurality of large protruding parts having a width of 13 μm or more and 48 μm or less and a height of 5 μm or more and 13 μm or less, and a plurality of small protruding parts forming unevenness having a ten-point average roughness Rz of 1.0 μm or more and 6.0 μm or less on the surface of the large protruding parts. The surface layer contained a urethane polymer, and the elongation at breakage of the surface layer was 285% or more and 525% or less. Then, according to the examples, tearing/breakage of the elastic body layer, peeling of the surface layer, and toner contamination were suppressed. Besides, excellent charging properties were achieved.

Further, according to the examples, it can be seen that by adjusting the width and height of the large protruding part and the roughness Rz of the surface of the large protruding part, it is possible to further improve the tearing/breakage of the elastic body layer. For example, by setting the width of the large protruding part to 15 μm or more and 45 μm or less, the height of the large protruding part to 12 μm or less, and the roughness Rz of the surface of the large protruding part to 5.5 μm or less, the tearing/breakage of the elastic body layer can be further improved (Examples 1 to 3, 5, and 7 to 12). Also, it can be seen that the charging properties can be further improved by adjusting the height of the large protruding part. For example, by setting the height of the large protruding part to 6 μm or more and 12 μm or less, the charging properties of the elastic body layer can be further improved (Examples 3 to 4 and 7 to 12). Moreover, it can be seen that peeling of the surface layer can be further improved by adjusting the roughness Rz of the surface of the large protruding part. For example, by setting the roughness Rz of the surface of the large protruding part to 1.5 μm or more, peeling of the surface layer can be further improved (Examples 6 and 7 to 12).

In addition, when Examples 7 to 8 and Examples 21 to 22 are compared, it can be seen that peeling of the surface layer and the charging properties can be further improved when the inter-protrusion distance between the large protruding parts is 25 μm or more and 55 μm or less. Further, when Examples 9 to 10 and Examples 22 to 24 are compared, it can be seen that tearing/breakage of the elastic body layer and peeling of the surface layer can be further improved when the inter-protrusion distance between the small protruding parts is 0.4 μm or more and 3.8 μm or less. Also, when Examples 11 to 12 and Examples 25 to 26 are compared, it can be seen that peeling of the surface layer and the charging properties can be further improved when the surface roughness Rz of the concave portion between the large protruding parts is 1.0 μm or more and 6.0 μm or less. Moreover, when Examples 7 to 12 and Example 27 are compared, it can be seen that, by applying surface treatment to the elastic body layer to form hydroxyl groups or hydroperoxy groups on the surface, tearing/breakage of the elastic body layer and peeling of the surface layer can be further improved. In addition, when Examples 18 to 19 and Examples 28 to 29 are compared, it can be seen that the tearing/breakage of the elastic body layer, the charging properties, and the toner contamination can be further improved when the thickness of the surface layer is 0.1 μm or more and 2.0 μm or less. Further, when Example 20 and Example 30 are compared, it can be seen that toner contamination can be further improved when the number of functional groups of the polyol constituting the urethane polymer of the surface layer is 3 or less.

Although the embodiments and examples of the disclosure have been described above, the disclosure is by no means limited to the above-described embodiments and examples, and various modifications can be made without departing from the scope of the disclosure.

What is claimed is:

1. A charging roll for electrophotographic equipment, comprising:

a shaft body;

an elastic body layer formed on an outer circumferential surface of the shaft body; and a surface layer formed on an outer circumferential surface of the elastic body layer, wherein the elastic body layer contains silicone rubber, and comprises a plurality of large protruding parts having a width of 13 μm or more and 48 μm or less and a height of 5 μm or more and 13 μm or less on the outer circumferential surface of the elastic body layer, and a plurality of small protruding parts forming unevenness having a ten-point average roughness Rz of 1.0 μm or more and 6.0 μm or less on a surface of the large protruding parts, and the surface layer contains a urethane polymer, and has an elongation at breakage of 285% or more and 525% or less.

2. The charging roll for electrophotographic equipment according to claim 1, wherein the urethane polymer has an NCO index of 100 or more and 150 or less.

3. The charging roll for electrophotographic equipment according to claim 1, wherein the surface layer has a thickness of 0.1 μm or more and 2.0 μm or less.

4. The charging roll for electrophotographic equipment according to claim 1, wherein the surface layer is formed along an uneven surface formed by the plurality of small protruding parts of the elastic body layer.

5. The charging roll for electrophotographic equipment according to claim 1, wherein the elastic body layer has a hydroxy group or a hydroperoxy group formed on the outer circumferential surface of the elastic body layer.

6. The charging roll for electrophotographic equipment according to claim 1, further comprising the plurality of small protruding parts forming unevenness having a ten-point average roughness Rz of 1.0 μm or more and 6.0 μm or less on a surface between the large protruding parts.

7. The charging roll for electrophotographic equipment according to claim 1, wherein the large protruding parts have a distance therebetween that is 25 μm or more and 55 μm or less.

8. The charging roll for electrophotographic equipment according to claim 1, wherein the small protruding parts have a distance therebetween that is 0.4 μm or more and 3.8 μm or less.

9. The charging roll for electrophotographic equipment according to claim 1, wherein the elastic body layer has a surface area ratio $S/S_0$ of 2.2 or more and 7.7 or less, where S: measured surface area of the elastic body layer $S_0$: theoretical surface area in a case where a surface of the elastic body layer is a flat surface.

10. The charging roll for electrophotographic equipment according to claim 1, wherein the outer circumferential surface of the elastic body layer is subjected to excimer treatment or corona treatment.

* * * * *